United States Patent [19]

Mackay

[11] 4,280,327
[45] Jul. 28, 1981

[54] SOLAR POWERED TURBINE SYSTEM

[75] Inventor: Robin Mackay, Rancho Palos Verdes, Calif.

[73] Assignee: The Garrett Corporation, Los Angeles, Calif.

[21] Appl. No.: 34,325

[22] Filed: Apr. 30, 1979

[51] Int. Cl.³ .................................................. F03G 7/02
[52] U.S. Cl. ............................ 60/641 AC; 60/641 AB; 60/650; 126/449; 126/450
[58] Field of Search ............ 60/641, 650, 682, 641 A, 60/641 AB, 641 AC, 641 AG; 126/438, 439, 440, 449, 451

[56] References Cited

U.S. PATENT DOCUMENTS

| 1,700,675 | 1/1929 | Goddard | 126/451 |
| 3,203,167 | 8/1965 | Green, Jr. | 60/641 |
| 3,964,464 | 6/1976 | Hockman | 126/439 X |
| 4,044,753 | 8/1977 | Fletcher et al. | 126/438 X |
| 4,121,564 | 10/1978 | Schwartz | 126/438 |
| 4,183,220 | 1/1980 | Shaw | 60/650 X |

FOREIGN PATENT DOCUMENTS 2412908  10/1945  Fed. Rep. of Germany ........... 126/440

Primary Examiner—Allen M. Ostrager
Assistant Examiner—Stephen F. Husar
Attorney, Agent, or Firm—Stuart O. Lowry; James W. McFarland; Albert J. Miller

[57] ABSTRACT

A turbine system including a turbine rotatably driven by solar-heated air for driving a load such as an electrical power generator or the like.

62 Claims, 3 Drawing Figures

SOLAR POWERED TURBINE SYSTEM

BACKGROUND OF THE INVENTION

This invention relates to the use of solar energy as a power source. More specifically, this invention relates to a turbine system having a turbine rotatably driven by solar-heated air for driving rotational machinery such as electrical generators or the like.

Considerable emphasis recently has been focused upon the use of solar energy as a source of motive power. In this regard, a wide variety of devices have been proposed for converting heat energy obtained from solar radiation into usable power such as electrical power or the like. Developments in this area have included solar-powered photocells which chemically convert solar radiation into usable electrical energy. These systems are, of course, highly desirable in that solar radiation is freely available, thereby reducing or eliminating the demand for conventional and less readily available fossil-type fuels.

Recent developments in the solar energy area have included proposals for utilizing solar energy for driving rotational equipment such as turbines or the like. In this regard, turbine-driven generators are quite attractive for use in the conversion of solar energy because of the relatively high efficiency of turbomachinery rotating groups, and because of the relatively long operating life of such equipment. In the prior art, turbine-driven generator sets have been proposed wherein solar energy is concentrated and focused upon an absorber as by means of a solar heliostat. The solar absorber has typically comprised a device for transferring the concentrated solar radiation energy to a high temperature, high pressure working fluid as by means of a relatively complex heat exchanger. The high pressure working fluid in turn is expanded through a high pressure turbine for conversion to rotational energy for driving electrical generators or the like. See, for example, U.S. Pat. No. 4,033,118 for an example of this type of system. However, these systems have not been widely used because of the complexity and expense of the heat exchanger, together with the required relatively large sizes of the heat exchanger and the radiation-collecting heliostat.

Some solar-powered systems have been proposed which attempt to eliminate the high pressure, high temperature heat exchanger used as a solar absorber. See, for example, U.S. Pat. No. 3,203,167 which discloses an atmospheric pressure solar absorber for transferring heat energy to ambient air which is then injected into a high pressure turbo-compressor cycle by means of a supersonic jet pump. However, the requirement of the jet pump, together with the high pressures and temperatures required for operating the turbo-compressor rotating group, still results in a relatively expensive and complex system which has not been commercially accepted.

The invention of this application provides an improved solar-powered turbine system which eliminates expensive and complicated heat transfer apparatus, and which is capable of operating at relatively low temperatures and pressures.

SUMMARY OF THE INVENTION

In accordance with the invention, a solar-powered turbine system comprises a cavity-type solar absorber for receiving concentrated solar radiation energy as by means of a heliostat or the like for focusing solar radiation into the absorber cavity. Air within the absorber is heated generally at atmospheric pressure by heat absorption and transfer means within the absorber, and the heated air is supplied directly to a rotatable turbine of a subatmospheric turbine system. The heated air generally at atmospheric pressure is expanded and cooled through the turbine to a subatmospheric pressure to convert the solar energy into power for rotationally driving the turbine. In turn, the turbine rotationally drives a system compressor, as well as power output means comprising an electrical generator or the like.

Expanded air is supplied from the turbine at subatmospheric pressure through a recuperator and a heat sink for further cooling prior to recompression by the system compressor. More specifically, the compressor recompresses the cooled air to approximately atmospheric pressure, and supplies the air to the solar absorber via the recuperator. In this manner, the recycled air picks up heat energy in the recuperator and in the absorber, and is recycled at elevated temperature and generally at atmospheric pressure to the turbine for re-expansion.

BRIEF DESCRIPTION OF THE DRAWINGS

The accompanying drawings illustrate the invention. In such drawings.

DETAILED DESCRIPTION OF THE PREFERRED EMBODIMENT

Figure 1:
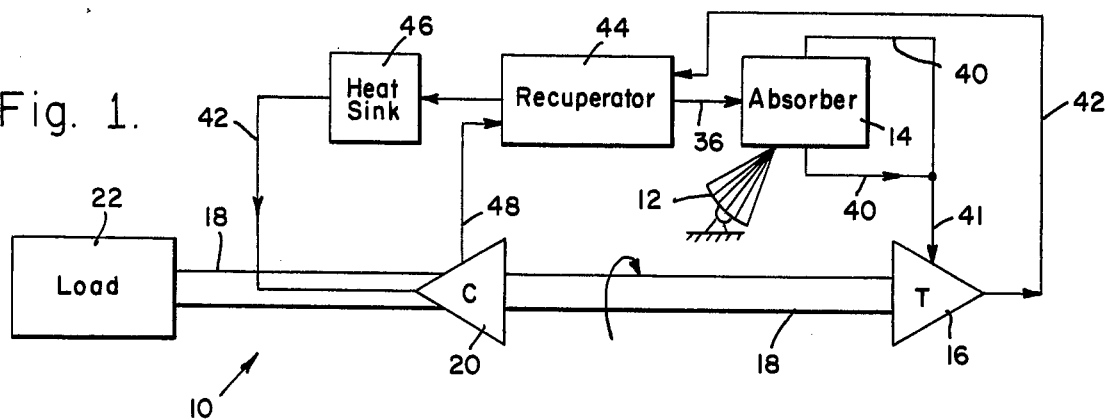
FIG. 1 is a schematic diagram illustrating the solar powered turbine system of this invention.

A solar-powered turbine system 10 of this invention is shown schematically in FIG. 1, and generally comprises a reflector 12 for receiving and concentrating solar radiation. The concentrated radiation energy is focused upon and supplied to a cavity-type solar absorber 14 which utilizes the radiation energy to heat ambient air generally at atmospheric pressure. The heated air is supplied to a subatmospheric turbine system including a turbine 16 and a compressor 20 mounted for rotation on a common shaft 18. The subatmospheric turbine system converts the heat energy in the heated air to rotational energy for driving the turbine 16 and compressor 20, and for driving a suitable load such as power output means comprising an electrical generator 22 or the like.

Figure 2:
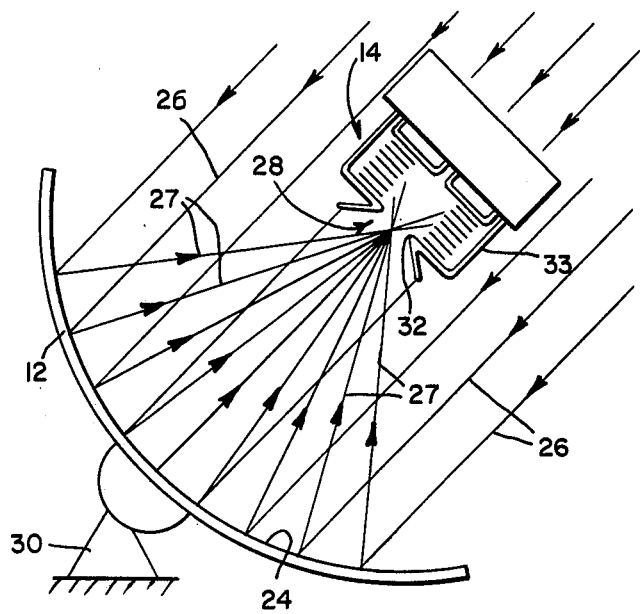
FIG. 2 is a schematic diagram illustrating the collection of solar energy for supply to the system of this invention.
Figure 3:
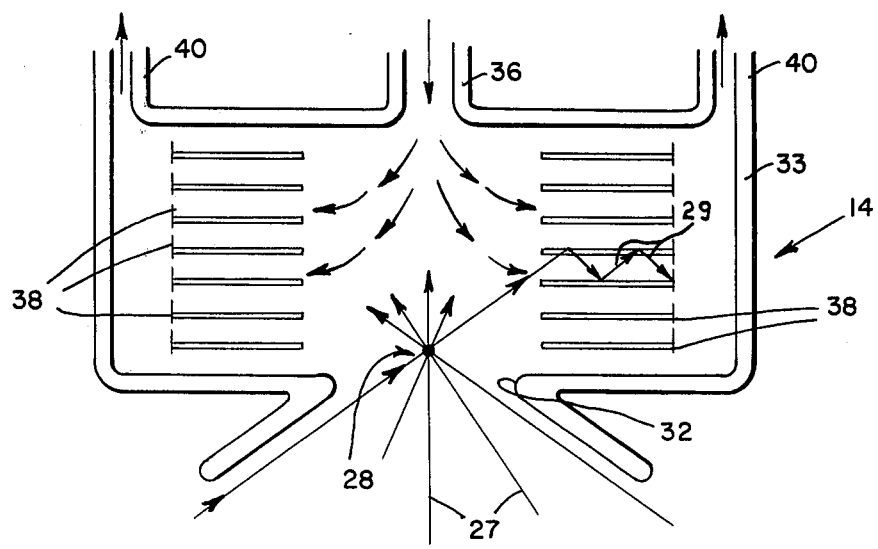
FIG. 3 is a schematic diagram illustrating one form of a solar absorber for use in the system of the invention.

The reflector 12 and the absorber 14 are illustrated in more detail in FIGS. 2 and 3. As shown, the reflector 12 comprises a generally dish-shaped member having an upwardly presented concave reflective surface 24 for receiving incident solar radiation as indicated by arrows 26. In practice, the reflector 12 is desirably generally parabolic in cross-section whereby the incident radiation is reflected as indicated by arrows 27 and converged or focused substantially at a point, as at 28. This focal point corresponds generally with a radiation entrance opening 32 of the absorber 14 whereby the incident solar radiation is concentrated and supplied to the absorber 14 for input to the turbine system 10. Conveniently, as shown, this reflective surface 24 is mounted upon a base or stand 30 which may include suitable controls (not shown) for shifting the position of the reflective surface in response to the angle of incident radiation. In this manner, the reflector 12 may be controlled for tracking the sun so as to control the position of the focal point 28. In this regard, the chamber 14 may be fixed in position whereby the reflector 12 and associated tracking controls comprise a solar heliostat. Alternately, the absorber 14 and turbine system 10 may be secured with respect to the reflector 12, and thus movable along with the reflector 12 as the reflector tracks the sun. In either event, suitable platform apparatus for supporting the absorber 14 is conventional in form, and thus is not shown or described in detail herein.

As illustrated in FIG. 3, the absorber 14 comprises a hollow generally cylindrical-shaped housing 33 open to atmosphere via the radiation entrance opening 32. Concentrated solar radiation collected and converged by the reflector 12 passes into the housing 33 initially into a central cavity 34. Within the central cavity 34, the incoming solar radiation communicates for radiative and convective heat transfer with air entering the cavity 34 via a conduit 36 disposed generally in opposition to the radiation entrance opening 32. Importantly, this incoming air is substantially at atmospheric pressure, and comprises the circulating working fluid of the turbine system 10 as will be described in more detail.

The central cavity 34 of the absorber 14 is circumferentially surrounded by spaced, parallel rows of heat transfer members 38, as illustrated schematically in FIG. 3. Radiation diverging within the housing 33 beyond the focal point 28 is incident upon these heat transfer members 38, and thereby effectively heats the heat transfer members to a high temperature level. The heat transfer members 38 in turn effectively pass heat energy to the air within the housing to further elevate the temperature level of the air. Importantly, this air is drawn from the central cavity 34 outwardly into heat transfer communication with the members 38 as by opposed conduits 40 for supplying the heated air to the turbine 16 of the turbine system 10 for expansion. That is, expansion of the air through the turbine 16 creates a partial vacuum within the conduits 40 as compared to the interior of the housing 33, and thereby draws the air out of the housing via the conduits 40.

In a preferred embodiment of the invention, the heat transfer members 38 comprise relatively porous ceramic tiles each having a reflective external surface. The tiles are arranged in parallel for free air flow radially outwardly from the housing central cavity 34. Diverging radiation within the housing 33 is incident upon the tiles, and heats the tiles by means of multiple re-radiative incidence upon parallel tiles as illustrated by arrows 29. The porous, reflective tiles absorb a portion of the incident radiation and reflect the remaining portion of the radiation, while providing extended heat transfer surface area within the housing for efficient heating of the circulating air. Importantly, re-radiative incidence upon the tiles is directed away from the radiation entrance opening 32 so as to improve thermal efficiency of the absorber 14 and to reduce reradiation losses through the opening 32. If desired, the tiles also may be advantageously suspended freely within the absorber 14 to allow for free thermal expansion and contraction thereof. A variety of suitable and relatively conventional suspension means may be used, and accordingly, the specific suspension means is not shown or described in detail.

The air heated within the absorber 14 is supplied to the turbine 16 via the pair of conduits 40 at opposite ends of the absorber. Conveniently, as shown in FIG. 1, the pair of conduits 40 merge into a single conduit 41 for supplying the heated air generally at atmospheric pressure to the turbine 16. The turbine 16 expands and cools the incoming heated air to a subatmospheric pressure, and thereby is rotatably driven by passage of the air. Such rotatable driving of the turbine 16 also rotatably drives the system compressor 20, as well as the electrical generator or load 22. Exhaust air from the rotating turbine 16 is coupled as by a conduit 42 to the compressor 20 for recompression of the air to approximately atmospheric pressure, and for resupply to the absorber 14.

The expanded and cooled exhaust air from the turbine 16 is further expanded and cooled prior to admission to the compressor 20. That is, the exhaust air supplied to the conduit 42 first passes through a recuperator 44 coupled along the conduit 42 for extraction of additional heat from the air. Then, the air is supplied through a heat sink 46 comprising an air-to-air heat exchanger or the like which is also coupled along the conduit 42 prior to supply to the compressor. In this manner, the temperature and pressure of the inlet air to the compressor 20 is substantially reduced for efficient compressor operation.

The compressor 20 recompresses the air to substantially atmospheric pressure, and simultaneously elevates the temperature level of the air. The recompressed air is supplied via a conduit 48 through a second flow path in the recuperator 44 whereby the recompressed air picks up substantial additional heat given up by the turbine exhaust air. Finally, the partially reheated and recompressed air is supplied to the absorber 14 via the inlet conduit 36 for absorption of additional solar energy and for recycling to the turbine 16.

The solar powered turbine system of this invention thus provides a solar-absorber for transferring solar radiation energy to a turbine system working fluid such as air at ambient pressure. The heated working fluid is continuously cycled through a low pressure subatmospheric turbine system for conversion of the heat energy to rotational power.

In one working embodiment of the invention, a parabolic reflector 12 having a cross sectional diameter of about twenty feet is used to concentrate solar radiation for supply to an absorber 14 designed to provide heated air having an outlet temperature of approximately 1600° F. to the turbine 16. This heated air is supplied at substantially atmospheric pressure to the turbine 16 for expansion therethrough to a subatmospheric pressure of about 5.0 p.s.i.a., and a temperature of about 1200° F. Additional heat energy is extracted from the turbine exhaust air via the recuperator 44 which is designed to lower the temperature level of the air to about 400° F., and via the heat sink 46 which is designed to further reduce the air temperature level to slightly above ambient temperature, say on the order of about 90° F.

The compressor 20 is designed to recompress the air to approximately atmospheric pressure, and at the same time to reheat the air to about 325° F. Further heat energy is added to the recompressed air within the recuperator 44 whereupon the temperature level of the air recycled to the absorber 14 is approximately 1100° F. Therefore, in continuous steady state operation, the absorber 14 is designed to elevate the temperature of the incoming air approximately 500° F. to obtain the design output temperature of the absorber 14 of about 1600° F. With this design, a continuous flow of heated air is supplied to the turbine 16 for driving the compressor 20, and for driving a generator 22 having a power output on the order of about eight kilowatts. If higher power output is desired, multiple units of this invention may be electrically tied together to provide a combined electrical power output. Alternately, larger units may be designed to include multiple or larger reflectors 12.

A wide variety of modifications and improvements of the solar-powered turbine system of this invention are believed to be possible within the skill of the art. That is, various absorber constructions for absorbing solar radiant heat energy and for transferring the energy to ambient air at atmospheric pressure are believed to be possible within the scope of the art. For example, the direction of air flow through the absorber may be reversed, if desired. Moreover, the entrance opening 32 of the absorber may be closed by a suitable transparent panel so as to confine the system to closed cycle working fluid operation. Still further, the turbine 16 may be combined with suitable battery or gas-powered driving means for operation of the system when insufficient solar radiation is available. Accordingly, no limitation of the invention disclosed herein is intended except by way of the appended claims.

What is claimed is:

1. A turbine system comprising a turbine and a compressor mounted on a common rotatable shaft; means for transferring solar radiant heat energy to a working fluid substantially at atmospheric pressure; means for coupling the heated working fluid to said turbine for expansion to a subatmospheric pressure; and means for coupling the expanded working fluid to said compressor for recompression substantially to atmospheric pressure and for resupply to said transfer means for reheating.

2. A turbine system as set forth in claim 1 wherein said working fluid comprises air.

3. A turbine system as set forth in claim 1 including a load coupled to said shaft for rotatable driving thereby.

4. A turbine system as set forth in claim 1 wherein said transfer means comprises absorber means for receiving solar radiation, and for transferring heat energy therein to said working fluid; and solar radiation collection and concentration means for concentrating solar radiation and supplying the concentrated radiation to said absorber means.

5. A turbine system as set forth in claim 4 wherein said absorber means comprises a housing having a radiation entrance opening, and said collection and concentration means comprises a generally dish-shaped reflector for reflecting and focusing solar radiation for passage through said radiation entrance opening.

6. A turbine system as set forth in claim 1 wherein said means for coupling the heated working fluid to said turbine comprises a conduit coupled between said transfer means and said turbine for supplying the fluid for rotatably driving said turbine.

7. A turbine system as set forth in claim 1 wherein said means for coupling the expanded working fluid to said compressor comprises a conduit coupled between said turbine and compressor for supplying the fluid for rotatably driving said compressor.

8. A turbine system as set forth in claim 1 wherein said means for coupling the expanded working fluid to said compressor and then to said transfer means comprises first conduit means coupled between said turbine and compressor, and second conduit means coupled between said compressor and transfer means, and further including a recuperator having a pair of flow paths respectively coupled along said first and second conduit means for effecting cooling of the working fluid in said first conduit means and heating of the working fluid in said second conduit means.

9. A turbine system as set forth in claim 8 further including a heat sink coupled along said first conduit means between said recuperator and compressor for further cooling the working fluid.

10. A turbine system as set forth in claim 1 wherein said transfer means includes a solar absorber comprising a hollow housing having a rdiation entrance opening for receiving radiation and for directly communicating the housing interior with ambient atmosphere to maintain the housing interior at atmospheric pressure; means for supplying working fluid into the housing interior; a plurality of heat transfer members in the housing interior for absorbing radiant heat energy and for transferring the absorbed heat energy to the working fluid; and means for passing the heated working fluid out of said housing.

11. A turbine system as set forth in claim 10 wherein said heat transfer members are formed to have relatively reflective surfaces, and are mounted within the housing generally parallel to each other.

12. A turbine system as set forth in claim 11 wherein said heat transfer members are freely suspended within said housing.

13. A turbine system as set forth in claim 12 wherein said heat transfer members are formed from a relatively porous ceramic material.

14. A turbine system as set forth in claim 10 wherein said means for supplying working fluid into the housing interior comprises an opening formed in the housing generally opposite the radiation entrance opening, and said means for passing the heated working fluid out of said housing comprises a plurality of openings formed in the housing and positioned such that working fluid passing through said plurality of openings first passes in heat exchange relation with said heat transfer members.

15. A turbine system comprising a turbine and a compressor mounted on a common rotatable shaft; means for absorbing solar radiant heat energy and for transferring the absorbed heat energy to a working fluid substantially at atmospheric pressure; means for coupling the heated working fluid to said turbine for expansion therethrough to a subatmospheric pressure; means for coupling the expanded working fluid to said compressor for recompression substantially to atmospheric pressure; and means for coupling the recompressed working fluid to said absorber means for reheating.

16. A turbine system as set forth in claim 15 including heat exchanger means for passing working fluid flowing from said turbine to said compressor in heat exchange relation with working fluid flowing from said compressor to said absorber means.

17. A turbine system as set forth in claim 16 further including a heat sink coupled between said heat exchanger means and compressor.

18. A solar absorber comprising a hollow housing having a solar radiation entrance opening; a plurality of parallel heat transfer members freely suspended within said housing and each having a relatively reflective surface for reflecting and absorbing radiation heat energy; said members being arranged to define and surround a central cavity communicating with the entrance opening; a supply opening formed in said housing generally opposite the radiation entrance opening and communicating with the central cavity for introduction of a working fluid into the housing interior; and a plurality of outlet openings formed in said housing such that working fluid flowing between said supply opening and outlet openings passes first in heat exchange relation with said heat transfer members.

19. A method of transferring solar radiation heat energy to a working fluid comprising the steps of providing a solar absorber having a housing with a radiation entrance opening formed therein; concentrating solar radiation for passage into the housing via the radiation entrance opening; absorbing radiation heat energy with a plurality of parallel heat transfer members mounted within the housing and each having a relatively reflective surface for reflecting and absorbing the heat energy; and circulating the working fluid substantially at atmospheric pressure through the housing in heat exchange relation with the heat transfer members.

20. The method of claim 19 including freely suspending the heat transfer members within the housing.

21. The method of claim 19 including forming the heat transfer member from a relatively porous ceramic material.

22. The method of claim 19 wherein said circulating step comprises supplying working fluid to the housing via a fluid supply opening formed in the housing generally opposite the radiation entrance opening; and passing the fluid from the housing via a plurality of fluid outlet openings formed in the housing such that fluid movement between the supply opening and outlet openings guides the fluid into heat exchange relation with the heat transfer members.

23. A turbine system comprising a turbine and a compressor mounted on a common rotatable shaft;
means for transferring solar radiant heat energy to a working fluid substantially at atmospheric pressure including a solar absorber comprising a hollow housing having a radiation entrance opening for receiving radiation; means for supplying working fluid into the housing interior comprising an opening formed in the housing generally opposite the radiation entrance opening; a plurality of heat transfer members in the housing interior for absorbing radiant heat energy and for transferring the absorbed heat energy to the working fluid; and means for passing the heated working fluid out of said housing comprising a plurality of openings formed in the housing and positioned such that working fluid passing through said plurality of openings first passes in heat exchange relation with said heat transfer members;
means for coupling the heated working fluid to said turbine for expansion to a subatmospheric pressure; and
means for coupling the expanded working fluid to said compressor for recompression substantially to atmospheric pressure and for resupply to said transfer means for reheating,
said heat transfer members arranged within said housing to define and surround a central cavity communicating between the radiation entrance opening and the working fluid supply opening.

24. A turbine system as set forth in claim 15 including reflector means for receiving solar radiation, and for concentrating and reflecting the radiation to said absorber means.

25. A turbine system as set forth in claim 15 wherein said absorber means comprises a hollow housing having a radiation entrance opening for receiving radiation; means for supplying working fluid into the housing interior; a plurality of heat transfer members in the housing interior for absorbing radiant heat energy and for transferring the absorbed heat energy to the working fluid; and means for passing the heated working fluid out of said housing.

26. A turbine system as set forth in claim 25 wherein said heat transfer members are formed to have relatively reflective surfaces, and are freely suspended within said housing generally parallel to each other.

27. A turbine system as set forth in claim 25 wherein said means for supplying working fluid into the housing interior comprises an opening formed in the housing opposite the radiation entrance opening, and said means for passing the heated working fluid out of said housing comprises a plurality of openings formed in the housing and positioned such that working fluid passing through said plurality of openings first passes in heat exchange relation with said heat transfer members.

28. A turbine system comprising a turbine and a compressor mounted on a common rotatable shaft;
means for absorbing solar radiant heat energy and for transferring the absorbed heat energy to a working fluid substantially at atmospheric pressure, comprising a hollow housing having a radiation entrance opening for receiving radiation; means for supplying working fluid into the housing interior comprising an opening formed in the housing opposite the radiation entrance opening; a plurality of heat transfer members in the housing interior for absorbing radition heat energy and for transferring the absorbed heat energy to the working fluid; and means for passing the heated working fluid out of said housing comprising a plurality of openings formed in the housing and positioned such that working fluid passing through said plurality of openings first passes in heat exchange relation with said heat transfer members;
means for coupling the heated working fluid to said turbine for expansion therethrough to a subatmospheric pressure;
means for coupling the expanded working fluid to said compressor for recompression substantially to atmospheric pressure; and
means for coupling the recompressed working fluid to said absorber means for heating,
said heat transfer members arranged within said housing to define and surround a central cavity communicating between the radiation entrance opening and the working fluid supply opening.

29. A turbine system comprising a turbine and a compressor mounted on a common rotatable shaft; an absorber for absorbing solar radiation heat energy and for transferring the same to a working fluid substantially at atmospheric pressure; means for coupling the heated working fluid for expansion through said turbine to a subatmospheric pressure; means for coupling the expanded working fluid to said compressor for recompression substantially to atmospheric pressure; means for coupling the recompressed working fluid to said absorber for reheating; a recuperator for passing the expanded working fluid and the recompressed working fluid in heat exchange relation with each other to cool the former and to heat the latter; and a heat sink coupled between said recuperator and compressor for further cooling the expanded working fluid.

30. A turbine system as set forth in claim 29 wherein said absorber comprises a hollow housing having a radiation entrance opening for receiving radiation; means for supplying working fluid into the housing interior; a plurality of heat transfer members in the housing interior for absorbing radiant heat energy and for transferring the absorbed heat energy to the working fluid; and means for passing the heated working fluid out of said housing.

31. A solar absorber comprising a hollow housing having a solar radiation entrance opening; a plurality of parallel heat transfer members within said housing and each having a relatively reflective surface for reflecting and absorbing radiation heat energy; and means for circulating a working fluid through said housing in heat exchange relation with said heat transfer members,
   said circulating means including a fluid supply opening formed in said housing generally opposite the radiation entrance opening; and a plurality of fluid outlet openings formed in said housing such that passage of the fluid through said housing causes said fluid to move in heat exchange relation with said heat transfer members, said heat transfer members being arranged to form and surround a central cavity communicating between the fluid supply opening and the radiation entrance opening.

32. A method of converting solar radiation heat energy to rotational energy comprising the steps of providing a turbine and a compressor mounted on a common rotatable shaft; transferring with transfer means solar radiant heat energy to a working fluid substantially at atmospheric pressure; expanding the working fluid through the turbine to a subatmospheric pressure to rotatably drive the turbine and the compressor; recompressing the expanded working fluid through the compressor to substantially atmospheric pressure; and resupplying the recompressed working fluid to the transfer means for reheating.

33. The method of claim 32 including providing air as the working fluid.

34. The method of claim 32 including coupling a rotatably driven load to said shaft whereby said load is rotatably driven upon rotation of the turbine.

35. The method of claim 32 including transferring radiant heat energy to the working fluid within an absorber having heat transfer members for absorbing the heat energy and for transferring the same to the working fluid; and collecting and concentrating with reflector means solar radiation for supply to the absorber.

36. The method of claim 32 including transferring radiant heat energy to the working fluid within an absorber having a relatively small radiation entrance opening; and concentrating and reflecting solar radiation for passage through the opening with a generally dish-shaped reflector.

37. The method of claim 32 including passing the expanded working fluid and the recompressed working fluid in heat exchange relation with each other to cool the former and to heat the latter.

38. The method of claim 37 including further cooling the expanded working fluid subsequent to heat exchange passage with respect to the recompressed working fluid.

39. A method of converting solar radiation heat energy to rotational energy comprising the steps of transferring with absorber means solar radiant heat energy to a working fluid substantially at atmospheric pressure; expanding the working fluid through a turbine to a subatmospheric pressure to rotatably drive the turbine, coupling the turbine to a compressor by a common shaft whereby rotation of the turbine rotatably drives the compressor; recompressing the expanded working fluid through the compressor to substantially atmospheric pressure; resupplying the recompressed working fluid to the absorber means for reheating; passing the expanded working fluid and the recompressed working fluid in heat exchange relation with each other through a recuperator to cool the former and to heat the latter; and further cooling the expanded working fluid in a heat sink coupled between the recuperator and the compressor.

40. A method of transferring solar radiation heat energy to a working fluid comprising the steps of providing a solar absorber having a housing with a radiation entrance opening formed therein;
   concentrating solar radiation for passage into the housing via the radiation entrance opening;
   absorbing radiation heat energy with a plurality of parallel heat transfer members mounted within the housing and each having a relatively reflective surface for reflecting and absorbing the heat energy;
   circulating the working fluid substantially at atmospheric pressure through the housing in heat exchange relation with the heat transfer members, said circulating step comprising supplying working fluid to the housing via a fluid supply opening formed in the housing generally opposite the radiation entrance opening, and passing the fluid from the housing via a plurality of fluid outlet openings formed in the housing such that fluid movement between the supply opening and outlet openings guides the fluid into heat exchange relation with the heat transfer members; and
   arranging the heat transfer members within the housing to form and to surround a central cavity communicating between the fluid supply opening and the radiation entrance opening.

41. A method of transferring solar radiation heat energy to a working fluid comprising the steps of providing a hollow solar absorber housing having a relatively small radiation entrance opening; concentrating solar radiation for passage into the housing via the entrance opening; arranging a plurality of heat transfer members in parallel to form and surround a central cavity communicating with the radiation entrance opening, and each to have a relatively reflective surface for reflecting and absorbing the heat energy; supplying working fluid substantially at atmospheric pressure into the central cavity via a fluid supply opening formed in the housing generally opposite the radiation entrance opening; and passing the fluid from the housing via a plurality of fluid outlet openings formed in the housing such that the fluid movement between the supply opening and the outlet openings circulates the fluid in heat exchange relation with the heat transfer members.

42. A turbine system comprising a turbine and a compressor mounted on a common rotatable shaft; a hollow housing having a radiation entrance opening for receiving radiation; means for supplying working fluid into the housing interior substantially at atmospheric pressure; a plurality of heat transfer members in the housing interior for absorbing radiant heat energy and for transferring the absorbed heat energy to the working fluid, said heat transfer members arranged within said housing to define and surround a central cavity communicating between the radiation entrance opening and said means for supplying working fluid; means for coupling the heated working fluid to said turbine for expansion to a subatmospheric pressure; and means for coupling the expanded working fluid to said compressor for recompression substantially to atmospheric pressure and for resupply to said housing interior.

43. A turbine system as set forth in claim 42 wherein said working fluid comprises air.

44. A turbine system as set forth in claim 42 including a load coupled to said shaft for rotatable driving thereby.

45. A turbine system as set forth in claim 42 further including solar radiation collection and concentration means for concentrating solar radiation and supplying the concentrated radiation to said radiation entrance opening.

46. A turbine system as set forth in claim 45 wherein said collection and concentration means comprises a generally dish-shaped reflector for reflecting and focusing solar radiation for passage through said radiation entrance opening.

47. A turbine system as set forth in claim 42 wherein said means for coupling the heated working fluid to said turbine comprises a conduit coupled between said housing and said turbine for supplying the fluid for rotatably driving said turbine.

48. A turbine system as set forth in claim 42 wherein said means for coupling the expanded working fluid to said compressor comprises a conduit coupled between said turbine and compressor for supplying the fluid for rotatably driving said compressor.

49. A turbine system as set forth in claim 42 wherein said means for coupling the expanded working fluid to said compressor and then to said housing interior comprises first conduit means coupled between said turbine and compressor, and second conduit means coupled between said compressor and said housing interior, and further including a recuperator having a pair of flow paths respectively coupled along said first and second conduit means for effecting cooling of the working fluid in said first conduit means and heating of the working fluid in said second conduit means.

50. A turbine system as set forth in claim 49 further including a heat sink coupled along said first conduit means between said recuperator and compressor for further cooling the working fluid.

51. A turbine system as set forth in claim 42 wherein said heat transfer members are formed to have relatively reflective surfaces, and are mounted within the housing generally parallel to each other.

52. A turbine system as set forth in claim 51 wherein said heat transfer members are formed from a relatively porous ceramic material.

53. A method of transferring solar radiation heat energy to a working fluid comprising the steps of providing a solar absorber having a housing with a radiation entrance opening formed therein; concentrating solar radiation for passage into the housing via the radiation entrance opening; absorbing radiation heat energy with a plurality of parallel heat transfer members mounted within the housing and each having a relatively reflective surface for reflecting and absorbing the heat energy; circulating the working fluid substantially at atmospheric pressure through the housing in heat exchange relationship with the heat transfer members; and arranging the heat transfer members within the housing to form and to surround a central cavity communicating between the radiation entrance opening and a working fluid supply opening in the housing.

54. The method of claim 53 including forming the heat transfer member from a relatively porous ceramic material.

55. The method of claim 53 wherein said circulating step comprises supplying working fluid to the housing via said fluid supply opening which is formed in the housing generally opposite the radiation entrance opening; and passing the fluid from the housing via a plurality of fluid outlet openings formed in the housing such that fluid movement between the supply opening and outlet openings guides the fluid into heat exchange relation with the transfer members.

56. A method of converting solar radiation heat energy to rotational energy comprising the steps of driving a compressor by a turbine mounted on a common rotatable shaft therewith; concentrating solar radiation for passage into a housing via a radiation entrance opening therein; absorbing radiation heat energy with a plurality of heat transfer members arranged within the housing to form and to surround a central cavity communicating between the radiation entrance opening and a working fluid supply opening in the housing, said heat transfer members having relatively reflective surfaces for reflecting and absorbing heat energy; circulating the working fluid substantially at atmospheric pressure through the housing in heat exchange relation with the heat transfer members; expanding the heated working fluid through the turbine to a subatmospheric pressure to rotatably drive the turbine and the compressor; recompressing the expanded working fluid through the compressor to substantially atmospheric pressure; and resupplying the recompressed working fluid to the housing for reheating.

57. The method of claim 56 including providing air as the working fluid.

58. The method of claim 56 including coupling a rotatably driven load to said shaft whereby said load is rotatably driven upon rotation of the turbine.

59. The method of claim 56 including collecting and concentrating with reflector means solar radiation for supply to the absorber.

60. The method of claim 59 wherein said reflector means comprises a generally dish-shaped reflector.

61. The method of claim 56 including passing the expanded working fluid and the recompressed working fluid in heat exchange relation with each other to cool the former and to heat the latter.

62. The method of claim 61 including further cooling the expanded working fluid subsequent to heat exchange passage with respect to the recompressed working fluid.

* * * * *